United States Patent [19]

Angelini

[11] Patent Number: 4,466,618
[45] Date of Patent: Aug. 21, 1984

[54] SELF-ADJUSTING SEALING DEVICE FOR CHROMIUM PLATING PLANTS

[75] Inventor: Sergio Angelini, Milan, Italy

[73] Assignee: Brevetti Elettrogalvanici Superfiniture S.R.L., Brugherio, Italy

[21] Appl. No.: 375,785

[22] Filed: May 6, 1982

[30] Foreign Application Priority Data

May 20, 1981 [IT] Italy .................. 21844 A/81

[51] Int. Cl.³ .............. F16J 15/18; F16J 15/56; C25D 7/06
[52] U.S. Cl. .............. 277/12; 277/237 R; 277/DIG. 7; 204/28
[58] Field of Search .............. 277/12, 32, 166, 182, 277/183, 186, 237, DIG. 7; 164/75, 256; 118/48–50.1; 34/242; 204/28, 206, 207

[56] References Cited

U.S. PATENT DOCUMENTS

| | | | |
|---|---|---|---|
| 3,418,756 | 12/1968 | Baughman et al. | 277/DIG. 7 |
| 3,460,359 | 8/1969 | Schiffer | 277/DIG. 7 X |
| 3,751,344 | 8/1973 | Angelini | 204/28 |
| 3,852,170 | 12/1974 | Angelini | 204/28 |
| 3,868,106 | 2/1975 | Donckel et al. | 277/DIG. 7 |
| 3,888,300 | 6/1975 | Guichard et al. | 164/256 X |

FOREIGN PATENT DOCUMENTS

| | | | |
|---|---|---|---|
| 396061 | 7/1933 | United Kingdom | 277/DIG. 7 |
| 2058248 | 4/1981 | United Kingdom | 277/DIG. 7 |

Primary Examiner—Robert S. Ward
Attorney, Agent, or Firm—Beveridge, DeGrandi & Kline

[57] ABSTRACT

A sealing device with flexible seals, for chromium-plating of bars and the like, in which each seal has a central aperture for the passage of the bars, defined by flexible fins delimited by slits directed substantially in a radial direction, starting from the inner edge of the central aperture; each seal moreover is composed of two sheets of soft plastic material welded together and enclosing steel springs to stiffen the fins. The sealing device preferably comprises a combination of at least two coupled seals, in which the sealing fins of one of the seals overlap corresponding slits between adjacent fins in the other seal.

19 Claims, 23 Drawing Figures

SELF-ADJUSTING SEALING DEVICE FOR CHROMIUM PLATING PLANTS

BACKGROUND OF THE INVENTION

This invention concerns a sealing device for chromium-plating tanks of bars and the like, of the type in which the bars or pieces to be chromium-plated, having a variable profile, are made to move continuously through an anode immersed in a chromium-plating bath contained in a tank whose furthermost ends are provided with suitable sealing devices, in correspondence with apertures for passage of the bars.

In continuously chromium-plating of bars or large elongated pieces whose sectional profile may at times be constant and at times present variable sections both in width and with regard to geometric conformation, such as for example, in the case of large connecting rods, large piston rods, trunnions for mobile plates of presses or the like, the problem of sealing in the chromium-plating fluid is difficult to solve. In fact, with pads of normal rubber or other types of seals, it is only possible to achieve a perfect seal in particular cases and for small-diameter cylindrical bars; whereas in the case of very large bars or pieces, as defined, the chromium liquid tight, in a continuously chromium-plating process, has never been adequately solved due to the different features that the seals must possess.

In the above-mentioned cases, in fact, it is necessary to have seals made from sufficiently soft material, that is to say, which adapts perfectly to the peripheral profile of the bars, but which is also sturdy enough to withstand the pressure of the fluid, adapting itself, at the same time, to the variations in the sections along the length of the bar. The sealing problems with seals made of soft plastic material are heightened by the temperature of the chromium-plating bath, usually in the range of 50° C., which helps to make the seal itself even more precarious. The scope of this invention is to provide a sealing device for continuously chromium-plating tanks for bars and the like, which makes use of flexible seals, suitably shaped according to the geometric shape of the cross-sections and profile of the bar, in order to adequately solve the sealing problems for bars of considerable thickness; said seals being made with the required features of softness and elasticity, for the reasons stated above. A further scope of this invention is to provide a sealing device as defined which makes use of two or more seals, coupled together, having features which integrate each other, to further ensure the best sealing conditions.

SUMMARY OF THE INVENTION

According to the invention, a sealing device for continuously chromium-plating tanks for bars and the like is provided, the device comprising sealing means in correspondence with apertures for the passage of the bars, on the walls of the chromium-plating tank, in which each sealing means presents flexible sealing fins, defined by slits having a substantially radial direction, the inner edges of the fins delimiting a central aperture for passage of the bars, said aperture having dimensions substantially smaller than the cross-section of the bars themselves, and in which stiffening biasing means in the form of leaf springs are arranged all around, said leaf springs being oriented towards the aforesaid central aperture.

DESCRIPTION OF THE DRAWINGS

The features of the seals and a number of specific embodiments will be described hereunder, with reference to the figures in the accompanying drawings, in which.

DESCRIPTION OF THE INVENTION

Figure 1:
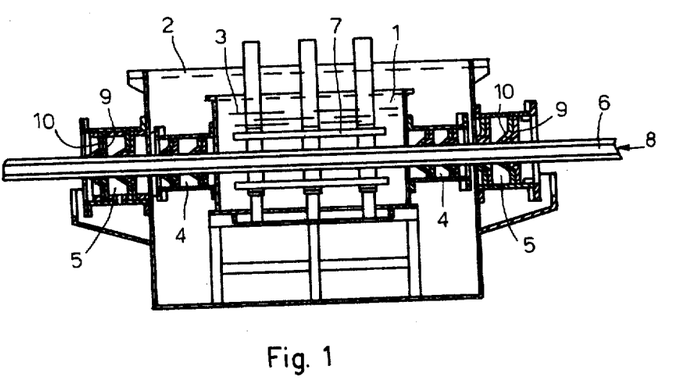
FIG. 1 shows a view of a generic continuously chromium-plating plant for bars, provided with sealing devices according to the invention.

FIG. 1 of the accompanying drawings shows an example of a continuously chromium-plating plant for large-sized bars or pieces, provided with sealing devices made with flexible seals, according to this invention; the plant of FIG. 1 is shown in order to more clearly illustrate the constructional features and the use of the sealing means according to the invention. Such plant comprises a chromium-plating tank 1 placed within an outer tank 2 capable of receiving the fluid of the chromium-plating bath 3 which overflows from the inner tank 1 and which is continuously recycled to the aforesaid inner tank. References 4 and respectively 5 indicate the sealing devices on the lateral walls of the tanks 1 and 2, in correspondence with the inlet and outlet apertures for the bars 6 to be chromium-plated, which pass through the chromium-plating anode, schematically indicated by 7.

Figure 2:
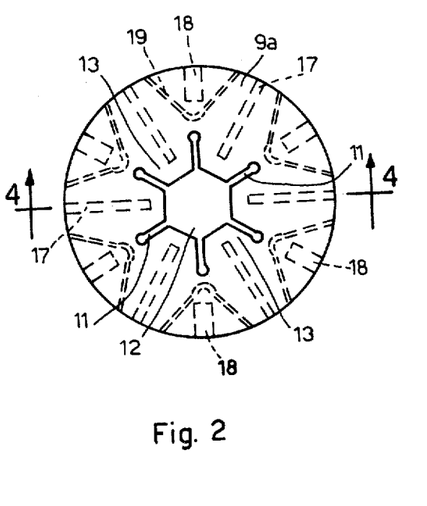
FIG. 2 shows a view of a first embodiment of a main seal for hexagonal bars.
Figure 3:
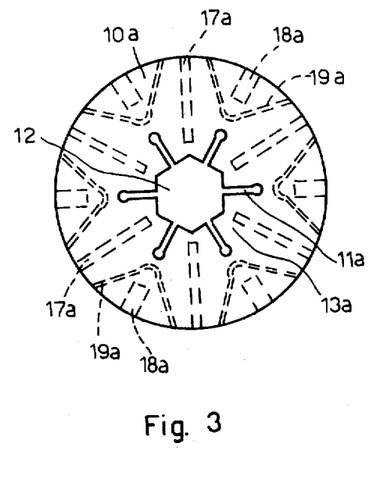
FIG. 3 shows a similar view of a supplementary seal, used together with that of the previous figure.
Figure 4:
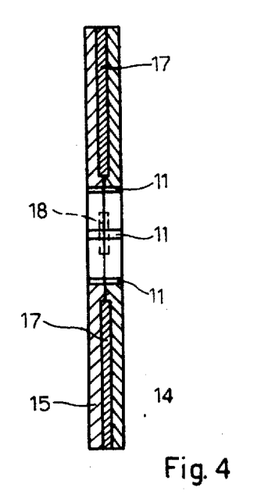
FIG. 4 shows an enlarged cross-section, along the line 4—4 of FIG. 2, illustrating the general features of the seals, according to the invention.

Each sealing device 4 and 5 defines a sealing chamber delimited by at least two sets of flexible seals each of such set comprising, with reference to the moving direction of the bar 6, indicated by the arrow 8, a main seal 9 and at least one supplementary seal 10, placed on one side and adhering to the first one, so that the features of the two seals integrate each other in order to ensure the best possible sealing conditions, as will be explained further on. With reference to FIGS. 2, 3 and 4 of the accompanying drawings, a description will be given of the basic constructional features of the seals according to the sealing device of this invention; consequently, all that described hereunder, with reference to the above-mentioned figures, will also apply for the subsequent cases. As shown, the main seal 9 of FIG. 2, suitable for a bar having a hexagonal cross-section and a constant profile, is disc-like in shape and comprises a set of grooves or radial slits 11, in correspondence with the apexes of the hexagon defined by the aperture 12 for the passage of the bars. In general, the aperture 12 for the passage of the bars in the main seal 9, is identical in shape as the cross-section of the bar, with the exception that the central aperture in the seal is smaller in size than the cross-section of the bar, so that the sealing fins 13, defined between adjacent slits 11, may bend and be kept adhering to the surfaces of the bar 6, with a sufficient pressure and over a sufficient length to ensure a perfect seal. The fins 13 and, consequently, the radial length of the slits 11, must be calculated and designed according to the maximum dimensions of the cross-sections of the bars which must pass through the seal; it is pointed out, merely by way of example, for the case under examination, that the dimensions of the central aperture 12 in the seal must be at least equivalent to half the size of the cross-section of the bar 6 and that, likewise, the length of the slits 11 must always be at least equivalent to half the cross-section of the aforementioned bar; these dimensions may be varied or modified by increasing or decreasing them as the case may be.

FIG. 4 shows further features of the seal according to the invention; it was mentioned previously in fact that in order to ensure a perfect seal, it is necessary for the seals to be made of sufficiently soft plastic material, for example PVC, in order to ensure that the fins 13 are kept adhering as closely as possible to the surfaces of the bar 6 to be chromium-plated, in order to achieve a perfect seal. However, in order to ensure a sufficient thrust of the fins 13 against the bar, as to withstand the pressure of the chromium-plating fluid, calls for an elastic behaviour of the fins themselves, a behaviour that soft plastic material is not, in itself, able to provide. Therefore, the seal comprises stiffening and biasing elements having suitable shapes, sizes and arrangements, as will be explained further on, with reference to each type of seal, which elements extend towards the central aperture and which stiffen the sealing fins 13. More precisely, as shown in FIGS. 2 and 4, each seal is composed of two PVC sheets 14 and 15, for example, in the form of a disc, between which the stiffening and biasing elements are arranged, only two of which are indicated by 17 in the cross-section of FIG. 4. The stiffening elements consist of flat springs or spring steel wire, having suitable dimensions, length and shape for the specific purpose; such springs are inserted between the two layers of plastic material 14 and 15 before they are pressed and welded or otherwise joined together.

Generally speaking, the arrangement of the springs in the seal, must be such as to stiffen and give elasticity not only to the individual fins 13, but also to the entire body of the seal, so that said seal gives the necessary sealing pressure even at the relatively high temperatures of the chromium-plating bath. As mentioned previously, the shape, dimensions and arrangement of the stiffening springs of the seal, must adapt to the various requirements and specific shapes of the seals; it can be stated, however, as a general indication, that each seal must comprise at least one radial spring, in particular a flat spring (indicated by 17) in correspondence with each fin.

Such spring may extend almost along the entire length of the fin, arriving close to the inner edge of the fin itself, as shown in FIG. 2, or may be shorter in length, as shown in some of the following figures. Moreover, each seal may, optionally and wherever possible, comprise radial springs (indicated by 18 in FIG. 2), each one of which aligned with a corresponding slit 11; in correspondence with each sealing fin or between two adjacent fins, a further secondary spring 19 may be optionally provided, arranged obliquely or consisting of pieces of spring steel wire, bent to form a V, with its apex pointing towards the centre of the seal. As mentioned previously, the sealing device comprises at least one main seal, and at least one supplementary seal placed downstream in the direction of the arrow 8, which bears the first seal against the thrust exerted by the pressure of the chromium-plating fluid and by the forward movement of the bar 6 to be chromium-plated; these seals must therefore present features which complement each other as will be explained hereunder with reference to FIGS. 2 and 3, and the figures of the subsequent examples.

FIG. 2 shows the main seal 9a, whilst FIG. 3 shows a supplementary seal 10a placed to the rear of the first. Both the seals 9a and 10a of FIGS. 2 and 3 are designed for a hexagonal-section bar; consequently, the main seal 9a presents six radial slits 11 in correspondence with the corners in the hexagonal aperture 12, aligned with each of which is a short flat-spring 18, whereas a flat spring 14 of greater length than the first is inserted in each sealing fin 13, as previously described. A third type of spring 19, consisting of a V-shaped steel wire is placed astride each flat spring 18, with the apex of the V-shaped spring facing towards the central aperture and interposed between the opposing ends of a spring 18 and, respectively, a slit 11 in the seal. The flat springs 17 and 18, apart from being different in length, in the case in question, also differ in width, the short spring 18 being wider than the spring 17. It is possible, thanks to these characteristics and to the use of steel wire springs, suitably bent and inserted between the two layers of plastic material 14 and 15 of the seal, to obtain different elasticity and flexibility features which tend to increase from the outer edge of the seal towards the inner edge of the aperture 12 for passage of the bars; thereby achieving a sufficiently strong yet flexible seal, capable of providing adequate sealing.

The main seal 9a alone would, in itself, be insufficient to ensure a good seal insofar as a certain amount of chromium-plating fluid may seep through the slits 11 in the seal situated on the side of the chromium-plating tank; therefore, the main seal 9a has been combined with a supplementary seal 10a which, in the case of hexagonal bars with a constant profile, has a wholly similar configuration to that of the main seal 9a, except for the fact that the entire set of slits 11a and stiffening springs 17a, 18a and 19a now results angularly displaced at an angle of 30° with respect to the main seal, that is to say, equivalent to half the angular width between two adjacent slits. Thus, in the seal 10a, each slit 11a is situated in correspondence with the median line of the side of the hexagon, whereas the longer flat springs 17a, are situated in correspondence with the corners of the hexagonal aperture; the remaining springs 18a and 19a are arranged similarly between springs 17a.

The combination of the two seals 9a and 10a, with the previously decribed arrangement of the slits and stiffening springs, proves to be advantageous for the two following reasons: firstly, the fins 13a of the supplementary seal 10a overlap the slits 11 in the main seal 9a and viceversa; secondly, each slit 11 in the seal 9a is situated in correspondence with a respective flat spring 17a of the other seal, and viceversa, thus preventing an excessive opening of the seal in correspondence with the aforementioned slits. The remaining V-shaped springs 19 and 19a instead, partially overlap one another, thereby providing a combination of seals with an integrated flexible structure, capable of providing less flexibility around the edges and more flexibility at the centre, in the area of adhesion to surfaces of the bars to be chromium-plated. What has been described for the seals of FIGS. 2 and 3, in general also applies in the case of seals for bars with a polygonal cross-section, with a greater or lesser number of sides.

Figure 5:
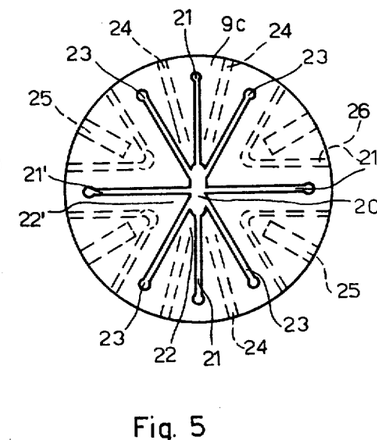
FIGS. 5 and 6 show views of a main seal and a supplementary seal, which can be used for bars with an elliptic cross-section, having elliptic portions of different dimensions, as represented schematically in FIG. 7.
Figure 6:
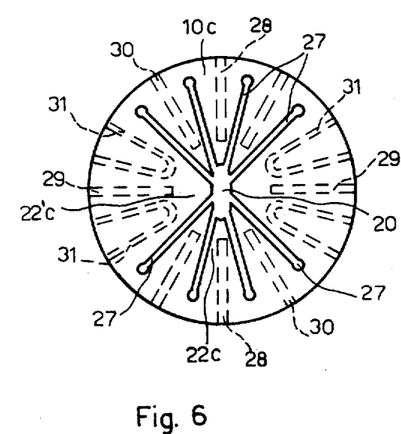
Figure 7:
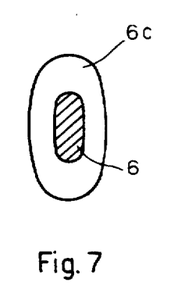

The example in FIGS. 5 and 6 shows a main seal 9c and a supplementary seal 10c, for forming a seal on bars 6 with an oval or elliptic cross-section, the longitudinal profile of which varies, for example, due to the presence of portions of bars 6c with oval sections of larger dimensions, as shown in FIG. 7; therefore, the seals 9c and 10c must be made in such a way as to ensure a perfect seal in both of these conditions.

In the case of FIG. 5, the main seal 9c also presents a central aperture 20 for passage of the bars 6, having a corresponding shpe but smaller dimensions than those of the bar; the seal 9c is also provided with radial slits 21 and 21', arranged at 90° to each other and, respectively, according to the major and minor axes of the oval shape of the cross-section of the bar. Between the slits 21 and 22, are further radial slits 23, arranged on a slant with respect to the first, and closer to the slits 21 of the main axis of the section. In this way, narrower sealing fins are formed between the slits 23 and 21, where the section of the bar is narrower with respect to the fins 22', formed between the slits 23 and 21. In all cases, the slits 21, 21' and 23 extend almost across the entire width of the seal, ending close to the outer edge; in general, it is always necessary for the distance between the centre of the seal and the farthermost end of the slit to be equivalent or close to the maximum width of the cross-section of the bar to be chromium-plated or part thereof, so as to allow an adequate aperture of the fins during the passage of portions 6c of bar.

The seal 9c comprises, moreover, flat springs 24 arranged radially between the slits 21 and 23, and shorter flat springs 25, between the slits 21' and 23, astride which flat springs are arranged further V-shaped springs 26 made of steel wire, with the apex of the V pointing towards the centre.

FIG. 6 shows a supplementary seal 10c with fins 22c and 22c', designed for use in combination with the main seal 9c of FIG. 5, according to the previously described principles. Therefore, in the case of FIG. 6 as well, the seal 10c presents an aperture 20 for passage of the bars, with radial slits 27 starting from the inner edge and ending close to the outer edge of the seal. The slits 27 in the seal 10c are angularly displaced with respect to the similar slits 21 and 23 in the main seal 9c, as shown. The seal 10c also presents flat springs 28 which overlap the slits 21 in the seal 9c, flat springs 29 which overlap the slits 21', and flat springs 30 between the remaining slits 27. Lastly, as shown, V-shaped springs 31, with their apex pointing towards the centre, are provided on both sides of the flat springs 29; in each case the length of the springs is such that their inner ends are arranged along an intermediate oval or elliptic line around the elliptic or oval cross-sections of the portions 6 and 6c of bar.

Figure 8:
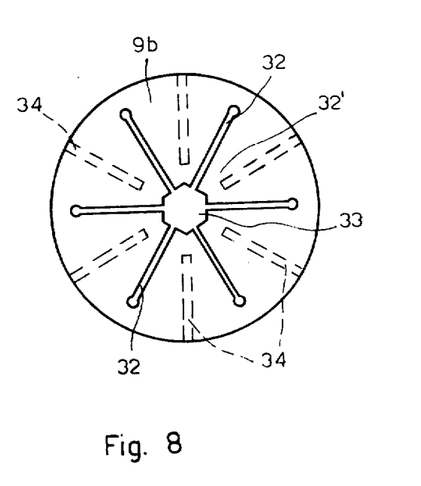
FIGS. 8, 9 and 10 show views of a main seal and two supplementary seals, which can be combined in use, for hexagonal bars having cylindrical portions of greater dimensions, as shown schematically in FIG. 11.
Figure 9:
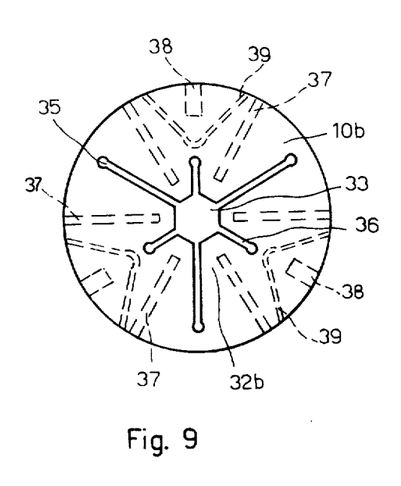
Figure 10:
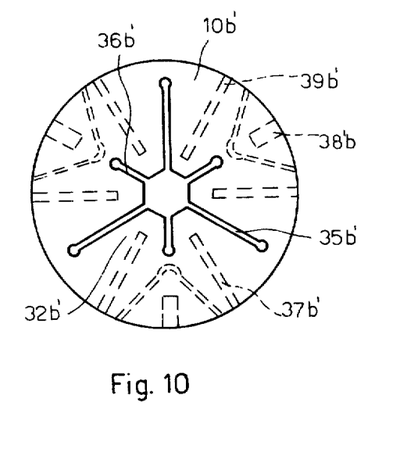
Figure 11:
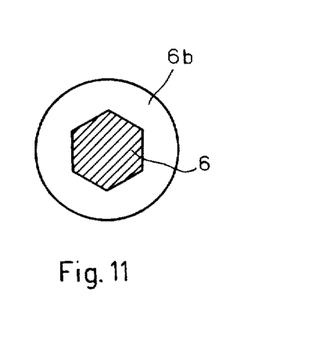

The example in FIGS. 8, 9 and 10 shows a main seal 9b and two supplementary seals 10b and 10b' which can be combined into a sealing device according to this invention, for bars 6, to be chromium-plated, having a hexagonal, or in general, polygonal cross-section with one or more cylindrical parts 6b, of greater diameter, as shown in FIG. 11.

In this case, the main seal 9b of FIG. 8 presents radial fins 32" defined by radial slits 32 always starting from the central aperture for passage of the bars, and flat springs 34 between the aforesaid slits 32; the springs 34 are aligned at the apexes of the hexagon whilst the slits are in correspondence with the medians of the sides of the hexagon, extending radially almost to the outer edge of the seal, so that the maximum of aperture allowed is greater than the width of the maximum cross-section 6b of the bars.

The first supplementary seal 10b (FIG. 9) which is placed immediately after the seal 9b, unlike the aforementioned main seal, due to the different shape of the sections along parts 6 and 6b of bar, presents radial fins 32b defined by diametrically opposed slits 35 and 36, of different lengths, in correspondence with the apexes of the hexagon, for example, one 35, approximately double the length of the other 36, between which are arranged flat springs 37 which overlap the slits 32 in the main seal 9b. A wider but shorter flat spring is aligned with the short slits 36 in the supplementary seal 10b and a further V-shaped spring 39 is placed astride each spring 38, always pointing the apex of the V towards the centre of the seal.

FIG. 10 shows a second supplementary seal 10b', to be placed after, and in contact with the supplementary seal 10b; the seal 10b' is substantially similar in construction to the seal 10b of FIG. 9, with the only difference between that, in the case of FIG. 10, the arrangement of the long slits 35' and the short slits 35b' defining the fins 32b', is now reversed with respect to the example in the previous figure; similarly, there is also a reversal in the arrangement of the springs 38b' and 39b' whereas that of the flat springs 37b remains unchanged with respect to the corresponding springs of the supplementary seal 10b previously described. In substance, the principle of this invention is always respected, and which consists in having fins with springs, in a secondary seal, placed in correspondence with slits in the main seal, and viceversa, with the addition, in this specific case, that each long slit in a secondary seal corresponds to a shorter slit in the other above-mentioned secondary seal.

Figures 12, 13, 14, 17:
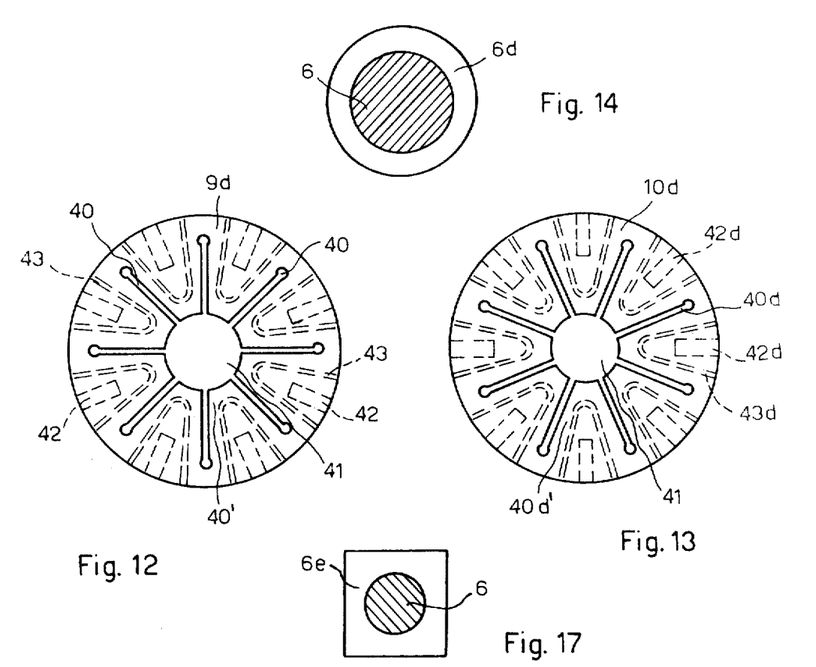
FIGS. 12 and 13 show views of a main seal and a supplementary seal, for cylindrical bars having one or more cylindrical portions of greater dimensions, as shown in FIG. 14.

FIGS. 12 and 13 show a fourth example of main seal 9d, and supplementary seal 10d, for a bar 6 with a circular cross-section and with one or more portions of cylindrical bar 6d of greater diameter, as shown in FIG. 14. The seals 9d and 10d are substantially identical in construction, with the only difference being that the fins 40' and 40d' defined by the slits in a seal and the relative springs, are angularly displaced with respect to the other seal, by an angle equivalent to half the angular width between two adjacent slits; consequently, the seals 9d and 10d both comprise radial slits 40 and, respectively, 40d, evenly spaced from one another, for example, by 45° which, starting from the edge of the central aperture 41, extend almost to the outer edge of the seal. Between two adjacent slits 40 and respectively 40d, is a first short flat-spring 42, 42d, astride which is a V-bent spring 43, 43d made of steel wire with its apex of the V always pointing towards the centre of the seal; in this case also, the width or diameter of the apertures 41, for passage of the bars, must be smaller than the diameter of the bar 6 inasmuch as the aperture of the fins defined by the slits in each seal, automatically adapts to the different diameters of the bars 6 or parts of bars 6d during the continuous chromium-plating process.

Figure 15:
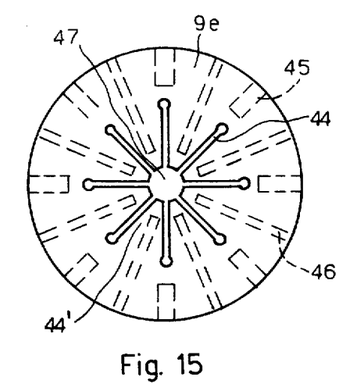
FIGS. 15 and 16 show views of a main seal and, respectively, a supplementary seal, for cylindrical bars having one or more portions of greater dimensions, with a square cross-section, as shown in FIG. 17.
Figure 16:
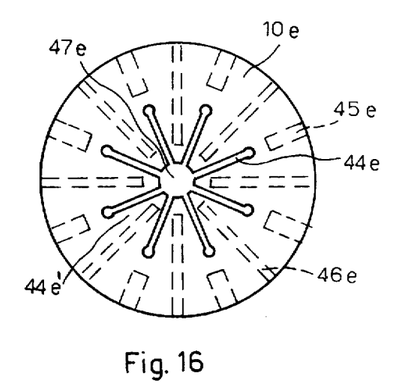
Figures 18, 19, 20:
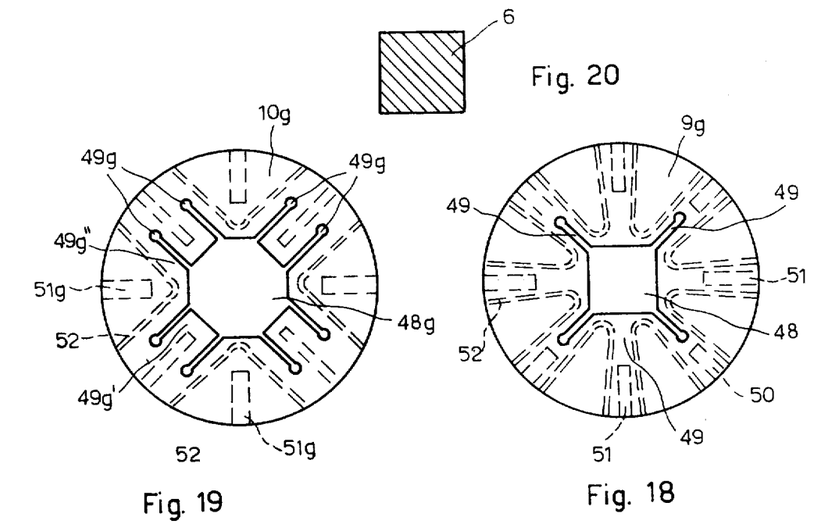
FIGS. 18 and 19 show views of a main seal and a supplementary seal for bars with a square cross-section, as shown in FIG. 20.

FIGS. 15 and 16 show a fifth embodiment of seals 9e and 10e for cylindrical bars 6 having one or more parts of bar 6e with a square section as shown in FIG. 17. In this case also, the two main seals 9e and supplementary seals 10e, are similar in construction, with the difference being due to the angular displacement of one seal equivalent to half the angle defined between two adjacent slits in the other seal, as in the previous case. Therefore, each seal comprises sealing fins 44' and 44e' defined by radial slits 44 and 44e of equal length, the slits being aligned with respective flat springs 45 and 45e which are relatively short; flat springs 46, 46e of greater length are inserted between adjacent slits. The flat springs 46, 46e end at a certain distance from the edge of the central aperture 47, 47e for passage of the bar 6 inasmuch as their ends lie in a circle with a diameter equal or only slightly different to the diameter of the bar 6. FIGS. 18 and 19 show a sixth embodiment of seals 9g and 10g for bars 6 with a squared section, as shown in FIG. 20. In this case, the main seal 9g of FIG. 18 presents a square-shaped central aperture with dimensions smaller than those of the bar 6, with fins 49' defined by four radial slits 49, starting from the apexes, or arranged on the diagonals of the square. Flat springs 50 are aligned with each slit 49, as in the previous cases, and further flat springs 51 are built into the seal in correspondence with the two orthogonal axes on the sides of the square; lastly, V-shaped springs, indicated by 52 are arranged between adjacent flat springs 50 and 51. In this specific case, the wire springs 52 extend further towards the centre, with respect to the aforementioned flat springs.

Unlike the main seal 9g, the supplementary seal 10g, in the example in question, presents an octagonal-shaped aperture 48g for passage of the bar, leading off from the apexes of which are pairs of slits parallel in the diagonals of the square aperture 48 of the main seal 9g. A flat spring 50g is arranged radially in each fin 49g' defined by each pair of parallel slits 49g, so as to overlap a corresponding slit 49 in the main seal 9g, whereas shorter flat springs 51g are arranged in the fins 49g'' along the orthogonal axes of the seal, in the same way as the flat springs 51. Lastly, V-shaped steel wire springs 52 are arranged astride the srings 51g, with the apex of the springs always pointing towards the centre of the seal. It can be seen, in particular, from confrontation of FIG. 18 and FIG. 19, that the dimensions of the octagonal aperture 48g are such that the inner edges of the fins 49g' defined by each pair of parallel slits 49g' touch the apexes of the square aperture 48 of the main seal 9g.

Figure 21:
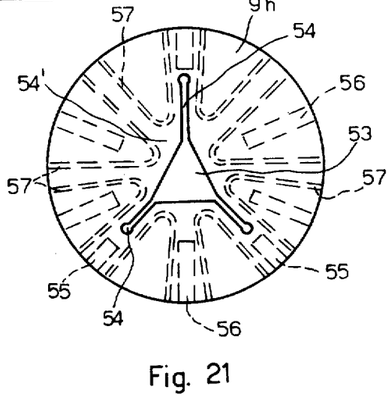
FIGS. 21 and 22 show views of a main seal and a supplementary seal for bars with a triangular cross-section, as shown in FIG. 23.
Figure 22:
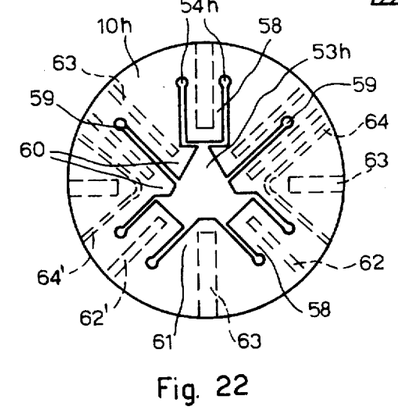
Figure 23:
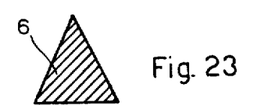

FIGS. 21 and 22 show a seventh and last embodiment of a main seal 9h and a supplementary seal 10h suitable for a bar 6 having a triangular cross-section shown in FIG. 23. The main seal 9h is made with a triangular aperture 53 of dimensions smaller than those of the bar 6, from whose apexes lead off radial slits 54 defining sealing fins 54', said slits 54 being aligned with corresponding flat springs 55, as shown in FIG. 21. Further radial springs 56 and V-shaped springs 57, are arranged in the fins and along the edge of the seal, on the three sides of the aperture 53 for passage of the bars. In this case as well, the supplementary seal 10h presents an aperture 53h for passage of the bars, which is larger in size and of a different shape, but which adapts as closely as possible to the triangular shape of the other seal. In particular, the supplementary seal 10h presents three fins 58 each defined by a pair of parallel slits 54h so that each fin overlaps a radial slit in the main seal 9h and two substantially radial slits 59, each arranged in correspondence with the oblique sides of the triangle shown. The inner edge of each fin 58 defined by the pair of parallel slits 54h, touches the respective apex of the triangle defined by the aperture 53 in the main seal, whereas the inner edges of the supplementary fins 60 and 61 between the main fins 53, are arranged close to the sides of the aforesaid triangle. Flat springs 62 are, moreover, arranged radially in the main fins 61 of the supplementary seal, so as to overlap the corresponding radial slits 54 in the main seal, whilst further flat springs 63 and V-shaped springs 64 are arranged in the secondary fins of the seal 10h.

It will be clear, from what has been described and shown with reference to the accompanying drawings, that a sealing device is provided for chromium-plating tanks, which makes use of special plastic seals, suitably stiffened with steel springs embedded in the seals themselves, and appropriately shaped so as to adapt to the different shapes and cross-sections of the bars to be chromium-plated; it is obvious, however, that it is possible, on the basis of the indications given previously, to achieve other shapes of seals suitable for other types of bars or parts of bars to be chromium-plated, without deviating from the concept of this invention.

What is claimed is:

1. A sealing device for continuously chromium-plating tanks for bars and the like, comprising seals in correspondence with apertures for the passage of the bars, on the walls of the chromium-plating tank, in which each seal presents flexible sealing fins, defined by slits having substantially a radial direction, the inner edges of the fins defining a central aperture for passage of the bars, substantially smaller in size than the cross-section of the bars, and in which stiffening spring elements, in the form of leaf springs are arranged around, and oriented towards the aforesaid central aperture in which each seal consists of two sheets of soft plastic material, pressed and welded together, between which are disposed said stiffening elements.

2. A device as claimed in claim 1, in which a flat spring is radially aligned with each slit in the seal.

3. A device as claimed in claim 1, further comprising V-shaped steel wire springs, with the apex of the V pointing towards the central aperture of the seal.

4. A device as claimed in claim 3, in which the V-shaped springs are arranged astride flat springs aligned with the radial slits in the seal.

5. A device as claimed in claim 1, in which each sealing fin comprises stiffening flat springs, pointing radially towards the inner edge of the central aperture.

6. A device as claimed in claim 1, comprising a main seal and at least one supplementary seal kept adhering to the main seal, the fins of the supplementary seal overlapping the slits between adjacent fins of the main seal.

7. A device as claimed in claim 6, in which each seal comprises stiffening springs in correspondence with the slits between fins of the other seal.

8. A device as claimed in claim 6, in particular for bars having a continuous profile with a polygonal cross-section, in which the main seal comprises radial slits which open out in correspondence with the apexes of the polygonal central aperture, the supplementary seal comprises similar slits which open out on the sides of the polygon defining the central aperture, and in which each seal comprises a flat spring which extends radially in each fin to a short distance from the central aperture, and V-shaped springs astride a flat spring aligned with each of the aforesaid slits.

9. A device as claimed in claim 6, in particular for bars having an elliptic or ovaloid section, with portions of bar of greater width and having a similar shape as the cross-section of the bar, in which the main seal comprises radial slits arranged along the axes of the ellipse of the aperture for passage of the bars, and oblique slits close to those arranged along the major axis of the aforementioned ellipse; flat springs which extend radially in the sealing fins defined between the slits arranged along the major axis and lateral slits, and flat springs and V-shaped springs astride the latter, in the sealing fins defined between the oblique slits and the slits along the minor axis of the aforesaid elliptic aperture; and in which the supplementary seal presents radial slits defining fins, each one of which provided with a flat spring in correspondence with each slit in the main seal; V-bent springs made of steel wire with the apex of the V pointing towards the central aperture being, moreover, arranged on the sides of each flat spring built into the sealing fins overlapping the slits arranged along the shorter axis of the elliptic aperture in the main seal.

10. A device as claimed in claim 6, in particular for bars having a polygonal cross-section, with portions of cylindrical bar of greater dimensions, comprising a main seal and at least two supplementary seals placed on the same side of the main seal, the latter presenting sealing fins defined by radial slits which open out in correspondence with the sides of the polygonal aperture for passage of the bars, and a flat spring in each fin, pointing radially towards the corner of the polygonal aperture, and in which each supplementary seal comprises sealing fins defined by opposing radial slits of different lengths, in correspondence with the corners of a polygonal-shaped central aperture, each fin comprising a flat stiffening spring, pointing radially towards the edge of the aforesaid aperture.

11. A device as claimed in claim 10, in which a flat spring and a V-shaped spring, with the apex pointing towards the centre, are arranged in correspondence with each of the shorter slits.

12. A device as claimed in claim 11, in which the radial slits and the stiffening springs of one of the supplementary seals, are angularly displaced by an angle equal to half the angular width between two adjacent slits in the other supplementary seal.

13. A device as claimed in claim 6, in particular for circular cross-section bars, comprising one or more cylindrical bar portions of greater dimensions, in which both the main seal and the supplementary seal comprise radial sealing fins, defined by slits of equal lengths, and in which each sealing fin comprises a flat stiffening spring and a V-shaped spring, with the apex of the V pointing toward the centre of the circular aperture for passage of the bars, said V-shaped spring being placed astride the flat spring.

14. A device as claimed in claim 6, in particular for circular cross-section bars, comprising portions of bar of greater width and with square-shaped cross-sections, in which both the main seal and the supplementary seal comprise radial sealing fins defined by slits of equal length and in which each sealing fin comprises a flat spring pointing radially towards the inner edge of a circular central aperture, the seal comprising moreover a shorter flat spring aligned with each radial slit.

15. A device as claimed in claim 6, in particular for square cross-section bars, in which the main seal comprises sealing fins defined by radial slits along the diagonals of the square central aperture for passage of the bars, in which flat srings are aligned with the radial slits, and in correspondence with the orthogonal axes of the aforesaid aperture, and in which V-shaped steel wire springs are interposed between two adjacent flat springs, said V-shaped springs extending with their apex towards the central aperture in the seal.

16. A device as claimed in claim 15, in which the supplementary seal comprises radial fins which delimit an octagonal-shaped central aperture, the fins arranged along the diagonals of the square aperture in the main seal, being delimited by pairs of parallel slits, and each fin comprising at least one flat spring arranged along a diagonal of the aforesaid aperture; a further flat radial spring, with a V-shaped spring astride the abovementioned flat spring, being arranged in each of the remaining sealing fins of the seal.

17. A device as claimed in claim 6, in particular for triangular cross-section bars, in which the main seal comprises fins defined by radial slits which open out in correspondence with the apexes of a triangular central aperture for passage of the bars; and in which flat springs are aligned with the abovementioned slits, whilst further flat springs of greater length are arranged radially in correspondence with the sides of the triangle, V-shaped springs with their apex pointing towards the central aperture being also provided astride the second flat springs and to the sides of the triangular aperture.

18. A device as claimed in claim 17, in which the supplementary seal comprises main sealing fins whose inner edges end in correspondence with the apexes of the triangular aperture of the main seal, and secondary fins whose inner edges are substantially arranged along the sides of the aforesaid triangular aperture, said main fins of the supplementary seal comprising flat springs which extend radially towards the inner edge and in correspondence with each slit in the main seal.

19. A device as claimed in claim 18, in which the main fins are delimited by pairs of slits parallel to the flat spring of the fin itself, and in which further flat springs are provided in the secondary fins, the flat springs relative to the lateral secondary fins being arranged on both sides of a further slit parallel to the springs themselves.

* * * * *